US012610165B2

(12) United States Patent
Ren

(10) Patent No.: US 12,610,165 B2
(45) Date of Patent: Apr. 21, 2026

(54) BENDING FOAM ASSEMBLY AND SPEAKER BOX

(71) Applicant: AAC Microtech (Changzhou) Co., Ltd., Changzhou (CN)

(72) Inventor: Li Ren, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 219 days.

(21) Appl. No.: 18/525,901

(22) Filed: Dec. 1, 2023

(65) Prior Publication Data

US 2024/0340564 A1     Oct. 10, 2024

Related U.S. Application Data

(63) Continuation of application No. PCT/CN2023/087203, filed on Apr. 10, 2023.

(51) Int. Cl.
| | |
|---|---|
| *H04R 9/06* | (2006.01) |
| *B32B 7/12* | (2006.01) |
| *B32B 15/04* | (2006.01) |
| *H04R 1/02* | (2006.01) |

(52) U.S. Cl.
CPC ................. *H04R 1/02* (2013.01); *B32B 7/12* (2013.01); *B32B 15/046* (2013.01); *B32B 2250/03* (2013.01); *B32B 2307/724* (2013.01); *B32B 2457/00* (2013.01)

(58) Field of Classification Search
CPC ........... H04R 1/02; B32B 7/12; B32B 15/046; B32B 2250/03; B32B 2307/724; B32B 2457/00
USPC .................................................. 381/334, 87
See application file for complete search history.

(56) References Cited

FOREIGN PATENT DOCUMENTS

| CN | 20631834 U | * | 7/2017 |
|---|---|---|---|
| CN | 206313834 U | * | 7/2017 |
| CN | 218383861 U | * | 1/2023 |

* cited by examiner

*Primary Examiner* — Ammar T Hamid
(74) *Attorney, Agent, or Firm* — Wiersch Law Group

(57) ABSTRACT

The present invention provides a bending foam assembly and a speaker box including the bending foam assembly. The bending foam assembly includes a foam layer, a first back adhesive layer, an air-permeable isolation layer, and a second back adhesive layer sequentially. The bending foam assembly further includes a third back adhesive layer and a metal foil layer disposed between the foam layer and the first back adhesive layer. The bending foam assembly mounted on a housing of the speaker box through the second back adhesive layer. The bending foam assembly of the present invention avoids the problem of warping in application by adding the metal foil layer.

5 Claims, 2 Drawing Sheets

100

BENDING FOAM ASSEMBLY AND SPEAKER BOX

FIELD OF THE PRESENT INVENTION

The present invention relates to the field of speaker box, and more particularly, to a bending foam assembly located on the speaker box.

DESCRIPTION OF RELATED ART

At present, the waterproof and dustproof requirements for mobile terminals such as mobile phones are becoming increasingly high, so speaker boxes used in mobile terminals also require good dustproof and waterproof capabilities.

Speaker boxes in related art usually have foam components attached to their sound holes to achieve the capability of waterproof and dustproof effects. However, the bending foam components usually have bending stress. When a peeling force of the back adhesive on the foam components is less than the bending stress, the foam components are easy to break free from the bending state, leading to structural warping. The commonly used foam components at the sound hole of the speaker box generally include a foam layer, mesh layer, and back adhesive layer. And in related art, people will use anti rebound adhesive in bending foam components, but this method can only improve the warping state, but cannot avoid the problem of warping.

Therefore, it is desired to provide a new bending foam assembly and a new speaker box which can overcome the above problems.

SUMMARY

In view of the above, the embodiment of the present invention provides a new bending foam assembly. By the present invention, the structure of bending foam assembly is stable and not easy to warp.

The present invention provides a bending foam assembly including a foam layer, a first back adhesive layer located on one side of the foam layer, an air-permeable isolation layer stacked on a side of the first back adhesive layer distal to the foam layer, and a second back adhesive layer stacked on a side of the air-permeable isolation layer distal to the first back adhesive layer. The bending foam assembly further includes a third back adhesive layer and a metal foil layer disposed between the foam layer and the first back adhesive layer.

As an improvement, each of the foam layer, the third back adhesive layer, the metal foil layer, the first back adhesive layer, and the second back adhesive layer is provided with an opening.

As an improvement, the metal foil layer is selected from one or more of aluminum, copper, and iron.

In view of the above, the embodiment of the present invention provides a new speaker box. By the present invention, the structure of bending foam assembly of the speaker box is stable and not easy to warp.

The present invention provides a speaker box including a housing including a sound hole and a speaker mounted in the housing. The housing includes a sound guiding channel connected to the sound hole and exporting a sound generated by the speaker out of the housing. The speaker box further includes a bending foam assembly covering the sound hole. The bending foam assembly includes a foam layer, a first back adhesive layer located on one side of the foam layer, an air-permeable isolation layer stacked on a side of the first back adhesive layer distal to the foam layer, and a second back adhesive layer stacked on a side of the air-permeable isolation layer distal to the first back adhesive layer. The bending foam assembly is mounted to the housing through the second back adhesive layer. The bending foam assembly further includes a third back adhesive layer and a metal foil layer disposed between the foam layer and the first back adhesive layer.

As an improvement, the metal foil layer is selected from one or more of aluminum, copper, and iron.

As an improvement, the bending foam assembly includes a first portion fixed on the sound guiding channel and a second portion bending and extending from the first portion and covering the sound hole.

As an improvement, each of the foam layer, the third back adhesive layer, the metal foil layer, the first back adhesive layer, and the second back adhesive layer is provided with an opening, and a size of the opening is greater than or equal to a size of the sound hole.

As an improvement, the opening is disposed on the second portion of the bending foam assembly.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
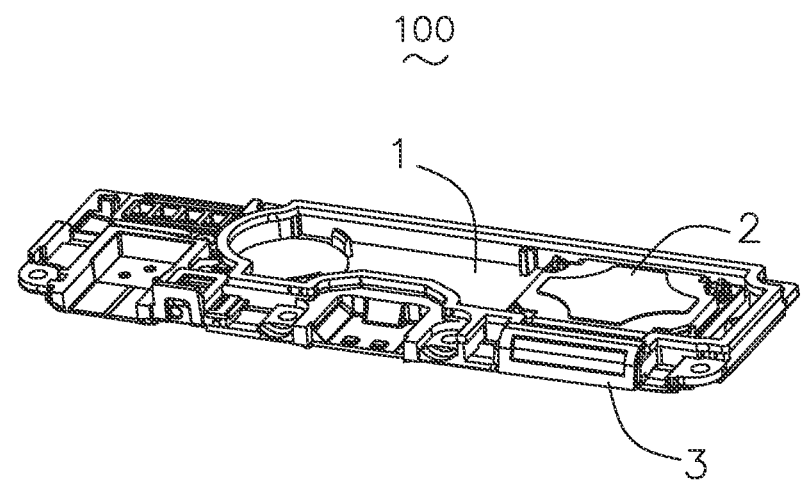
FIG. 1 is an illustrative isometric view of a speaker box in accordance with one embodiment of the present invention.
Figure 2:
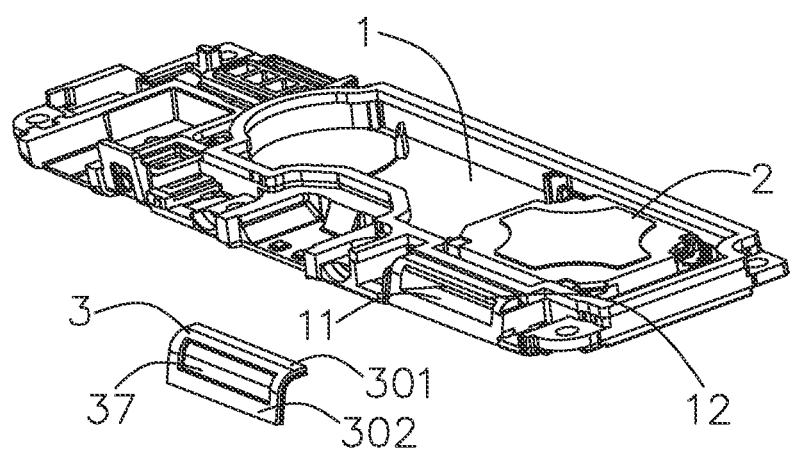
FIG. 2 is a partially exploded view of the speaker box of FIG. 1.
Figure 3:
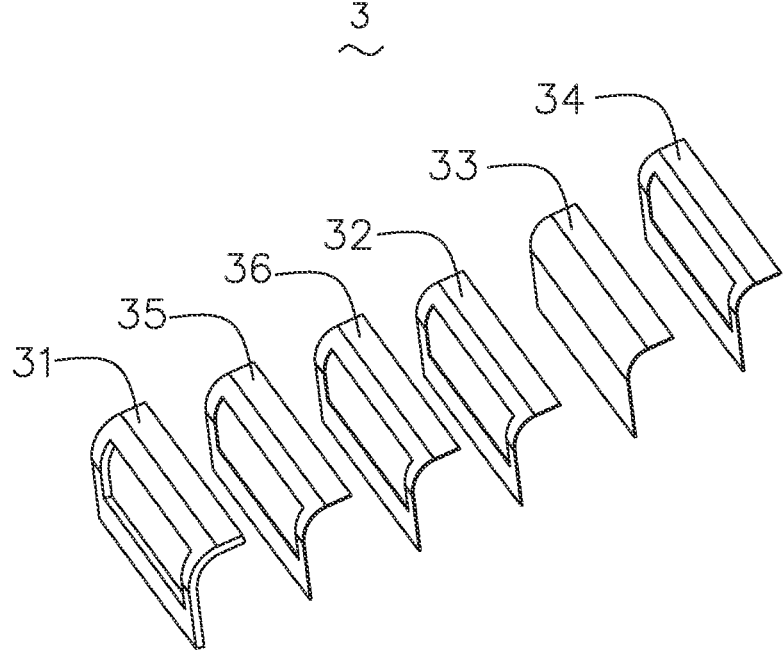
FIG. 3 is an exploded view of the bending foam assembly of the speaker box of FIG. 1.

Referring to the FIGS. 1-3, the present invention provides one embodiment of a speaker box 100. The speaker box 100 includes a housing 1 having a sound hole 11, a cover (not shown in Figs) closed with the housing 1, a speaker 2 mounted in the housing 1, and a bending foam assembly 3 covering the sound hole 11. The housing 1 includes a sound guiding channel 12 connected to the sound hole 11 and exporting a sound generated by the speaker 2 out of the housing 1.

The bending foam assembly 3 includes a foam layer 31, a first back adhesive layer 32, an air-permeable isolation layer 33, and a second back adhesive layer 34 sequentially. In detail, the first back adhesive layer 32 is located on one side of the foam layer 31, the air-permeable isolation layer 33 is stacked on a side of the first back adhesive layer 32 distal to the foam layer 31, and the second back adhesive layer 34 is stacked on a side of the air-permeable isolation layer 33 distal to the first back adhesive layer 32. The bending foam assembly 3 is mounted to the housing 1 through the second back adhesive layer 34. The bending foam assembly 3 further includes a third back adhesive layer 35 and a metal foil layer 36 disposed between the foam layer 31 and the first back adhesive layer 32. The outer contour shapes of the foam layer 31, the third back adhesive layer 35, the metal foil layer 36, the first back adhesive layer 32, the permeable isolation layer 33, and the second back adhesive layer 34 are consistent.

The metal foil layer 36 is made of materials with good rebound resistance, which can better resist bending stress, such as materials with strong plasticity such as aluminum, copper, iron, and so on. The metal foil layer 36 is selected from one or more of these materials with strong plasticity. Although these materials have strong plasticity, but they do not have an impact on the application scenario.

Each of the foam layer 31, the third back adhesive layer 35, the metal foil layer 36, the first back adhesive layer 32, and the second back adhesive layer 34 is provided with an opening 37. And the openings 37 on the foam layer 31, the third back adhesive layer 35, the metal foil layer 36, the first back adhesive layer 32, and the second back adhesive layer 34 have the same sizes. The openings 37 locate on a position corresponding to the sound hole 11 of the housing 1. The sizes of the openings 37 are greater than or equal to a size of the sound hole 11.

The bending foam assembly 3 includes a first portion 301 fixed on the sound guiding channel 12 and a second portion 302 bending and extending from the first portion 301 and covering the sound hole 11. The openings 37 are disposed on the second portion 302 of the bending foam assembly 3.

Compared with related technologies, the present invention provides a bending foam assembly including a foam layer, a first back adhesive layer located on one side of the foam layer, an air-permeable isolation layer stacked on a side of the first back adhesive layer distal to the foam layer, and a second back adhesive layer stacked on a side of the air-permeable isolation layer distal to the first back adhesive layer. The bending foam assembly further includes a third back adhesive layer and a metal foil layer disposed between the foam layer and the first back adhesive layer. The bending foam assembly of the present invention adds a metal foil layer, which plays a supporting and connecting role in the middle of the bending foam assembly, thereby increasing the overall plasticity of the bending foam assembly and avoiding the warping problem of the bending foam assembly in application.

Compared with related technologies, the present invention provides a speaker box including a housing including a sound hole and a speaker mounted in the housing. The housing includes a sound guiding channel connected to the sound hole and exporting a sound generated by the speaker out of the housing. The speaker box further includes a bending foam assembly covering the sound hole. The bending foam assembly includes a foam layer, a first back adhesive layer located on one side of the foam layer, an air-permeable isolation layer stacked on a side of the first back adhesive layer distal to the foam layer, and a second back adhesive layer stacked on a side of the air-permeable isolation layer distal to the first back adhesive layer. The bending foam assembly is mounted to the housing through the second back adhesive layer. The bending foam assembly further includes a third back adhesive layer and a metal foil layer disposed between the foam layer and the first back adhesive layer. The bending foam assembly of the speaker box of the present invention adds a metal foil layer, which plays a supporting and connecting role in the middle of the bending foam assembly, thereby increasing the overall plasticity of the bending foam assembly and avoiding the warping problem of the bending foam assembly in application.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A bending foam assembly, comprising:
a foam layer;
a first back adhesive layer located on one side of the foam layer;
an air-permeable isolation layer stacked on a side of the first back adhesive layer distal to the foam layer; and
a second back adhesive layer stacked on a side of the air-permeable isolation layer distal to the first back adhesive layer;
wherein the bending foam assembly further comprises a third back adhesive layer and a metal foil layer disposed between the foam layer and the first back adhesive layer; and each of the foam layer, the third back adhesive layer, the metal foil layer, the first back adhesive layer, and the second back adhesive layer is provided with an opening and the air-permeable isolation layer has no opening.

2. The bending foam assembly as described in claim 1, wherein the metal foil layer is selected from one or more of aluminum, copper, and iron.

3. A speaker box, comprising:
a housing including a sound hole and a sound guiding channel connected to the sound hole; and
a speaker mounted in the housing, the sound guiding channel exporting a sound generated by the speaker out of the housing;
a bending foam assembly covering the sound hole, the bending foam assembly comprising:
a foam layer;
a first back adhesive layer located on one side of the foam layer;
an air-permeable isolation layer stacked on a side of the first back adhesive layer distal to the foam layer; and
a second back adhesive layer stacked on a side of the air-permeable isolation layer distal to the first back adhesive layer;
wherein the bending foam assembly further comprises a third back adhesive layer and a metal foil layer disposed between the foam layer and the first back adhesive layer; the bending foam assembly comprises a first portion fixed on the sound guiding channel and a second portion bending and extending from the first portion and covering the sound hole, each of the foam layer, the third back adhesive layer, the metal foil layer, the first back adhesive layer, and the second back adhesive layer is provided with an opening, the air-permeable isolation layer has no opening, and a size of the opening is greater than or equal to a size of the sound hole.

4. The speaker box as described in claim 3, wherein the metal foil layer is selected from one or more of aluminum, copper, and iron.

5. The speaker box as described in claim 3, wherein the opening is disposed on the second portion of the bending foam assembly.

* * * * *